US011061950B2

(12) United States Patent
Daultani et al.

(10) Patent No.: US 11,061,950 B2
(45) Date of Patent: Jul. 13, 2021

(54) SUMMARY GENERATING DEVICE, SUMMARY GENERATING METHOD, AND INFORMATION STORAGE MEDIUM

(71) Applicant: Rakuten, Inc., Tokyo (JP)

(72) Inventors: Vijay Daultani, Tokyo (JP); Lasguido Nio, Tokyo (JP); Youngjoo Chung, Foster, CA (US)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 16/655,185

(22) Filed: Oct. 16, 2019

(65) Prior Publication Data

US 2020/0134011 A1 Apr. 30, 2020

(30) Foreign Application Priority Data

Oct. 26, 2018 (JP) .............................. JP2018-202347

(51) Int. Cl.
*G06F 40/30* (2020.01)
*G06F 16/34* (2019.01)
*G06F 16/33* (2019.01)
*G06F 40/253* (2020.01)
*G06F 40/216* (2020.01)

(52) U.S. Cl.
CPC ........ *G06F 16/345* (2019.01); *G06F 16/3334* (2019.01); *G06F 40/216* (2020.01); *G06F 40/253* (2020.01); *G06F 40/30* (2020.01)

(58) Field of Classification Search
CPC ...... G06F 16/345; G06F 40/253; G06F 40/30; G06F 40/216; G06F 16/3334

USPC .......................................................... 715/254
See application file for complete search history.

(56) References Cited

U.S. PATENT DOCUMENTS

| 2002/0052901 | A1* | 5/2002 | Guo ...................... G06F 16/345 |
| | | | 715/247 |
| 2002/0138528 | A1* | 9/2002 | Gong ..................... G06F 40/20 |
| | | | 715/254 |
| 2017/0228591 | A1* | 8/2017 | Simske ............... G06F 16/9535 |
| | | | 715/254 |

FOREIGN PATENT DOCUMENTS

| JP | 2000-353162 A | 12/2000 |
| JP | 2004-118545 A | 4/2004 |
| JP | 2010-128677 A | 6/2010 |
| JP | 2017-010107 A | 1/2017 |

OTHER PUBLICATIONS

Office Action dated Aug. 20, 2019, for corresponding JP application No. 2018-202347 and a partial translation of the Office Action.

(Continued)

*Primary Examiner* — Keith D Bloomquist
(74) *Attorney, Agent, or Firm* — HEA Law PLLC

(57) ABSTRACT

A summary generating device includes at least one processor that is configured to use a plurality of different algorithms, which extract one or more elements from a document and obtain an appearance degree of each of the extracted elements, so as to obtain the elements and the respective appearance degrees of the elements from the document, normalize the obtained appearance degrees for each of the algorithms, select at least one sentence from the document based on the normalized appearance degrees, and generate a summary of the document based on the selected sentence.

17 Claims, 11 Drawing Sheets

(56) References Cited

OTHER PUBLICATIONS

"Unsupervised extractive summarization via coverage maximization with syntactic and semantic concepts" Proceedings of the 53rd Annual Meeting of the Association for Computational Linguistics and the 7th International Joint Conference on Natural Language Processing (Short Papers), pp. 840-844, Beijing, China, Jul. 26-31, 2015. (http://www.aclweb.org/anthology/P15-2138).

* cited by examiner

| PRODUCT ID | DESCRIPTION | IMAGE | WORD-OF-MOUTH INFORMATION | SUMMARY |
|---|---|---|---|---|
| i00001 | Give everyone more room with Kee tables. Kee post legs come four to a set and are adjustable so you have a steady table with no wobble. This versatile table and chair set includes one 48-inch square Kee table with chrome post legs and four Burgundy Zeng Stack Chairs. The table is constructed of a thermal fused melamine Grey laminate tabletop that is 1-inch thick and finished with a black T-Mold edge band. Laminates are scratch, stain and scald resistant and wipe clean easily. A sleek alternative to pedestal style bases, this set of post legs comes in a modern chrome to match any decor. The legs are constructed of tubular steel with adjustable glides on the bottom of the base. Regency's Patent-Pending Zeng stack chair is not only unique, but durable, sturdy and versatile as well. The Zeng seat and back are treated with an anti-microbial agent, which makes it perfect for schools, waiting rooms, cafeterias and more. A reinforced black metal frame is designed to support up to 400lbs and a built in handle makes moving the chair easier. All Regency chairs are backed by a 5-year limited manufacturer's warranty on chair bases and frames and a 2-year limited manufacturer's warranty on chair mechanisms and upholstery. Kee tables are backed by a 10-year limited manufacturer's warranty. | 00001.jpg | My favorite table... | Kee post legs come four to a set and are adjustable so you have a steady table with no wobble. This versatile table and chair set includes one 48-inch square Kee table with chrome post legs and four Burgundy Zeng Stack Chairs. A sleek alternative to pedestal style bases, this set of post legs comes in a modern chrome to match any decor. The legs are constructed of tubular steel with adjustable glides on the bottom of the base. |
| i00002 | English Architectural I was reproduced on Premium Heavy Stock Paper which captures all of the vivid colors and details of the original. The overall paper size is 8.00 x 10.00 inches and the image size is 5.00 x 7.00 inches. This print is ready for hanging or framing. Brand New and Rolled and ready for display or framing. Print Title: English Architectural I. Paper Size: 8.00 x 10.00 inches. Product Type: Fine Art Print. Artist: The Vintage Collection. | 00002.jpg | It is very strong... | The overall paper size is 8.00 x 10.00 inches and the image size is 5.00 x 7.00 inches Print Title: English Architectural I. Paper Size: 8.00 x 10.00 inches. |
| ... | ... | ... | ... | ... |

FIG.6

| ATTRIBUTE | ATTRIBUTE VALUE |
|---|---|
| color | red,blue,green,black..... |
| size | S,M,L,XL...... |
| brand | AAA,BBB,XXX..... |
| . . . | . . . |

| ALGORITHM | ELEMENT | | APPEARANCE DEGREE | |
|---|---|---|---|---|
| BG | 1 | Kee tables | $W_{1,1}$ | 2 |
| BG | 2 | limited manufacture's | $W_{1,2}$ | 3 |
| BG | 3 | manufacturer's warranty | $W_{1,3}$ | 3 |
| ... | ... | ... | ... | ... |
| NE | 8 | kee | $W_{2,8}$ | 4 |
| NE | 9 | table | $W_{2,9}$ | 6 |
| ... | ... | ... | ... | ... |
| SD | 15 | manufacture_'s | $W_{3,15}$ | 3 |
| SD | 16 | legs_post | $W_{3,16}$ | 3 |
| ... | ... | ... | ... | ... |

FIG.8
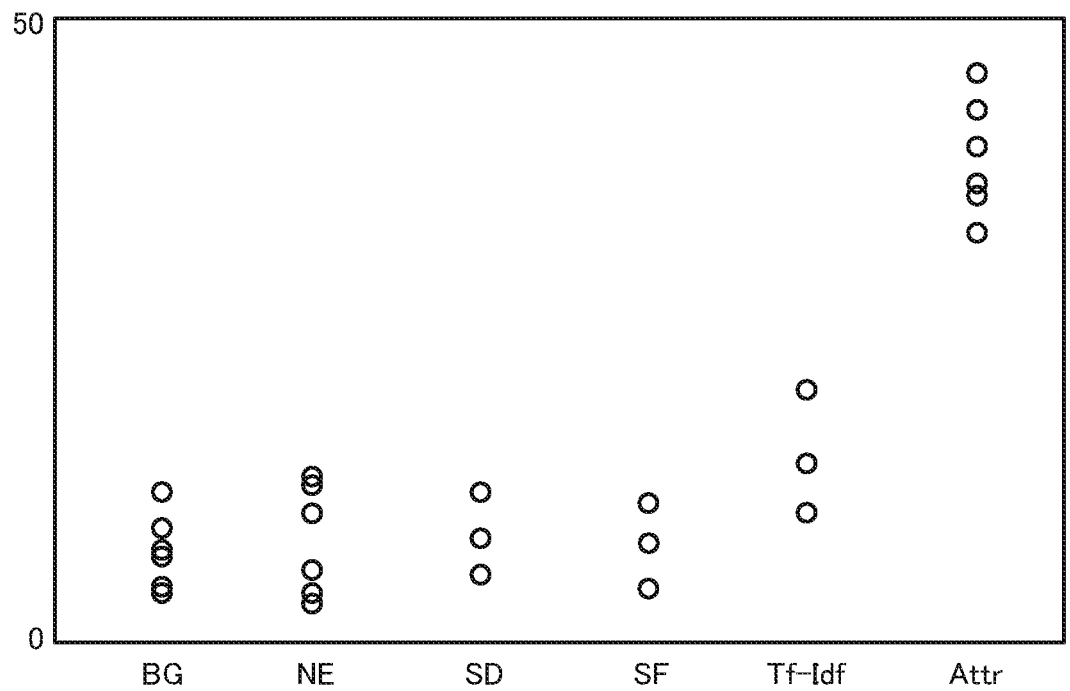
NORMALIZATION
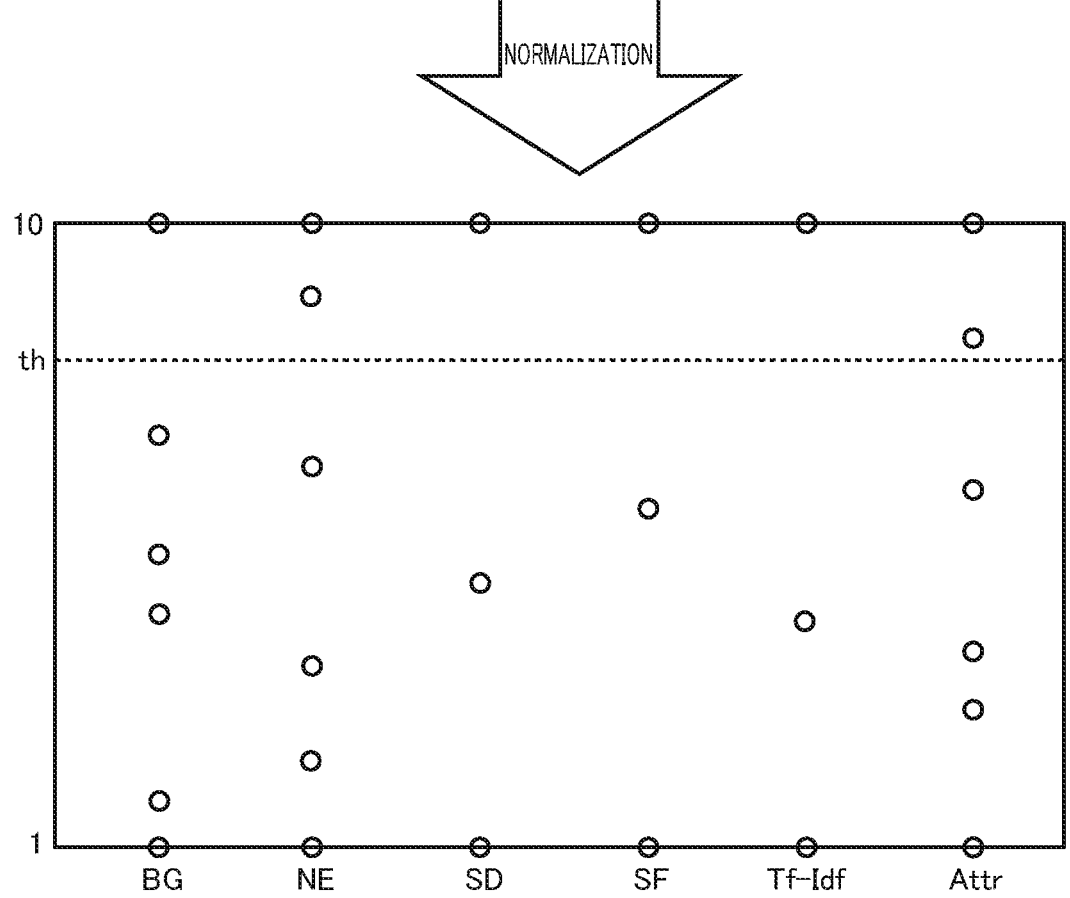

FIG.9

| |
|---|
| PRODUCT DESCRIPTION |
| Give everyone more room with Kee tables. Kee post legs come four to a set and are adjustable so you have a steady table with no wobble. This versatile table and chair set includes one 48-inch square Kee table with chrome post legs and four Burgundy Zeng Stack Chairs. The table is constructed of a thermal fused melamine Grey laminate tabletop that is 1-inch thick and finished with a black T-Mold edge band. Laminates are scratch, stain and scald resistant and wipe clean easily. A sleek alternative to pedestal style bases, this set of post legs comes in a modern chrome to match any decor. The legs are constructed of tubular steel with adjustable glides on the bottom of the base. Regency's Patent-Pending Zeng stack chair is not only unique, but durable, sturdy and versatile as well. The Zeng seat and back are treated with an anti-microbial agent, which makes it perfect for schools, waiting rooms, cafeterias and more. A reinforced black metal frame is designed to support up to 400lbs and a built in handle makes moving the chair easier. All Regency chairs are backed by a 5-year limited manufacturer's warranty on chair bases and frames and a 2-year limited manufacturer's warranty on chair mechanisms and upholstery. Kee tables are backed by a 10-year limited manufacturer's warranty. |
| SUMMARY ACCORDING TO THIS EMBODIMENT |
| Kee post legs come four to a set and are adjustable so you have a steady table with no wobble. This versatile table and chair set includes one 48-inch square Kee table with chrome post legs and four Burgundy Zeng Stack Chairs. A sleek alternative to pedestal style bases, this set of post legs comes in a modern chrome to match any decor. The legs are constructed of tubular steel with adjustable glides on the bottom of the base. |
| T e x t R a n k |
| Kee post legs come four to a set and are adjustable so you have a steady table with no wobble. This versatile table and chair set includes one 48-inch square Kee table with chrome post legs and four Burgundy Zeng Stack Chairs. The table is constructed of a thermal fused melamine Grey laminate tabletop that is 1-inch thick and finished with a black T-Mold edge band. A sleek alternative to pedestal style bases, this set of post legs comes in a modern chrome to match any decor. Regency's Patent-Pending Zeng stack chair is not only unique, but durable, sturdy and versatile as well. |
| P G |
| kee post legs come four to a set and are adjustable so you have a steady table with no wobble. this set of post legs comes in a modern chrome to match any decor. all regency chairs are backed by a 10-year limited manufacturer's warranty. |

FIG.10

| |
|---|
| PRODUCT DESCRIPTION |
| English Architectural I was reproduced on Premium Heavy Stock Paper which captures all of the vivid colors and details of the original. The overall paper size is 8.00 x 10.00 inches and the image size is 5.00 x 7.00 inches. This print is ready for hanging or framing. Brand New and Rolled and ready for display or framing. Print Title: English Architectural I. Paper Size: 8.00 x 10.00 inches. Product Type: Fine Art Print, Artist: The Vintage Collection. |
| SUMMARY ACCORDING TO THIS EMBODIMENT |
| The overall paper size is 8.00 x 10.00 inches and the image size is 5.00 x 7.00 inches. Print Title: English Architectural I. Paper Size: 8.00 x 10.00 inches. |
| T e x t R a n k |
| English Architectural I was reproduced on Premium Heavy Stock Paper which captures all of the vivid colors and details of the original. The overall paper size is 8.00 x 10.00 inches and the image size is 5.00 x 7.00 inches. This print is ready for hanging or framing. Brand New and Rolled and ready for display or framing. Print Title: English Architectural I. Paper Size: 8.00 x 10.00 inches. Product Type: Fine Art Print, Artist: The Vintage Collection. |
| P G |
| the overall paper size is 8.00 x 10.00 inches and the image size is 5.00 x 7.00 inches. this print is ready for hanging or framing. brand new and rolled and ready for display or framing. product type : fine art print, artist : the vintage collection. |

SUMMARY GENERATING DEVICE, SUMMARY GENERATING METHOD, AND INFORMATION STORAGE MEDIUM

CROSS-REFERENCE TO RELATED APPLICATION

The present application claims priority from Japanese application JP2018-202347 filed on Oct. 26, 2018, the content of which is hereby incorporated by reference into the application.

BACKGROUND OF THE INVENTION

1. Field of the Invention

An embodiment of the present invention relates to a summary generating device, a summary generating method, and an information storage medium.

2. Description of the Related Art

There are known techniques for generating a summary of a document, such as a web page. For example, Non-Patent Literature 1 (http://www.aclweb.org/anthology/P15-2138) describes four algorithms of BG (Bi-Grams), NE (Named Entities), SD (Syntactic Dependencies), and SF (Semantic Frames) as algorithms used in natural language processing so as to extract elements characterizing a document, acquire appearance frequency of the elements, select sentences included in the document based on the acquired appearance frequency, and generate a summary.

SUMMARY OF THE INVENTION

However, the extracted elements are different depending on the algorithms, and thus the distribution of the appearance frequency of the elements is unbalanced between the algorithms. As such, when the multiple algorithms are used to extract the elements and select the sentences included in the document based on the appearance frequency of the elements as in the above-described techniques, the element extracted by the algorithm that is inclined to extract an element having high appearance frequency is preferentially selected. As a result, there would be no difference between using multiple algorithms and using only a specific algorithm.

Algorithms have suitability for types of documents to analyze, and there is no known almighty algorithm. As such, it is desirable to flexibly add or change a suitable algorithm according to a type of a document for which a summary is generated. However, if an element extracted by using a specific algorithm is preferentially selected, adding or changing algorithms does not make any significant change to the result, and thus accuracy of the summary cannot be satisfactorily improved.

Non-Patent Literature 1 described above indicates assigning different weights to the frequency of the elements extracted by BG and the frequency of the elements extracted by the other algorithms. However, it is not at all clear how to determine the weights in order to improve the accuracy of the summary, and there is no realistic way to manually and heuristically assign suitable weights to various documents, which is virtually impossible to do.

The embodiment of the present invention have been conceived in view of the above, and an object thereof is to provide a summary generating device, a summary generating method, and an information storage medium capable of increasing accuracy of a summary.

In order to solve the above described problems, a summary generating device according to the embodiment of the present invention includes at least one processor is configured to use a plurality of different algorithms, which extract one or more elements from a document and obtain an appearance degree of each of the extracted elements, so as to obtain the elements and the respective appearance degrees of the elements from the document, normalize the obtained appearance degrees for each of the algorithms, select at least one sentence from the document based on the normalized appearance degrees, and generate a summary of the document based on the selected sentence.

A summary generating method according to the embodiment of the present invention includes using a plurality of different algorithms, which extract one or more elements from a document and obtain an appearance degree of each of the extracted elements, so as to obtain the elements and the respective appearance degrees of the elements from the document, normalizing the obtained appearance degrees for each of the algorithms, selecting at least one sentence from the document based on the normalized appearance degrees, and generating a summary of the document based on the selected sentence.

A non-transitory computer-readable information storage medium according to the embodiment of the present invention stores a program that causes a computer to use a plurality of different algorithms, which extract one or more elements from a document and obtain an appearance degree of each of the extracted elements, so as to obtain the elements and the respective appearance degrees of the elements from the document, normalize the obtained appearance degrees for each of the algorithms, select at least one sentence from the document based on the normalized appearance degrees, and generate a summary of the document based on the selected sentence.

In one aspect of the embodiment of the present invention, the at least one processor filters the elements based on the normalized appearance degrees, and uses the normalized appearance degrees of the filtered elements so as to select at least one sentence from the document based on a predetermined select condition.

In one aspect of the embodiment of the present invention, the predetermined select condition is where a sum total of the normalized appearance degrees of the elements included in the selected sentence is maximized and an amount of the selected sentence is less than a predetermined amount.

In one aspect of the embodiment of the present invention, the at least one processor uses an integer linear program so as to select at least one sentence from the document.

In one aspect of the embodiment of the present invention, the at least one processor determines a filtering condition based on a distribution of the normalized appearance degrees, and performs filtering based on the determined filtering condition.

In one aspect of the embodiment of the present invention, the at least one processor performs the filtering such that a predetermined percentage of the elements respectively having higher normalized appearance degrees are extracted, regardless of an algorithm used for extraction.

In one aspect of the embodiment of the present invention, the plurality of algorithms include at least one of a TF-IDF (Term frequency-Inverse document frequency) method or an attribute extraction method for extracting an attribute value of a predetermined attribute as the element.

In one aspect of the embodiment of the present invention, the at least one processor generates the summary by arranging the selected sentences in an order that the sentences appear in the document.

In one aspect of the embodiment of the present invention, the document is a description of a product, a facility, or service, the plurality of algorithms include the attribute extraction method for extracting an attribute value of an attribute of the product, the facility, or the service as the element, and the at least one processor performs normalization such that a distribution of the appearance degrees obtained by the attribute extraction method is close to a distribution of the normalized appearance degrees obtained by other algorithms.

BRIEF DESCRIPTION OF THE DRAWINGS

FIG. 5 is a diagram illustrating an example of data storage of a product database;

FIG. 6 is a diagram illustrating an example of data storage of an attribute database;

FIG. 7 is a diagram illustrating relationship between elements and their appearance degrees obtained by an obtaining unit;

FIG. 8 is a diagram illustrating changes in distribution of the appearance degrees of each algorithm before and after normalization;

FIG. 9 is a diagram illustrating an example of a summary generated by a generating unit;

FIG. 10 is a diagram illustrating an example of a summary generated by the generating unit.

DETAILED DESCRIPTION OF THE INVENTION

[1. Overall Configuration of Summary Generating System]

Figure 1:
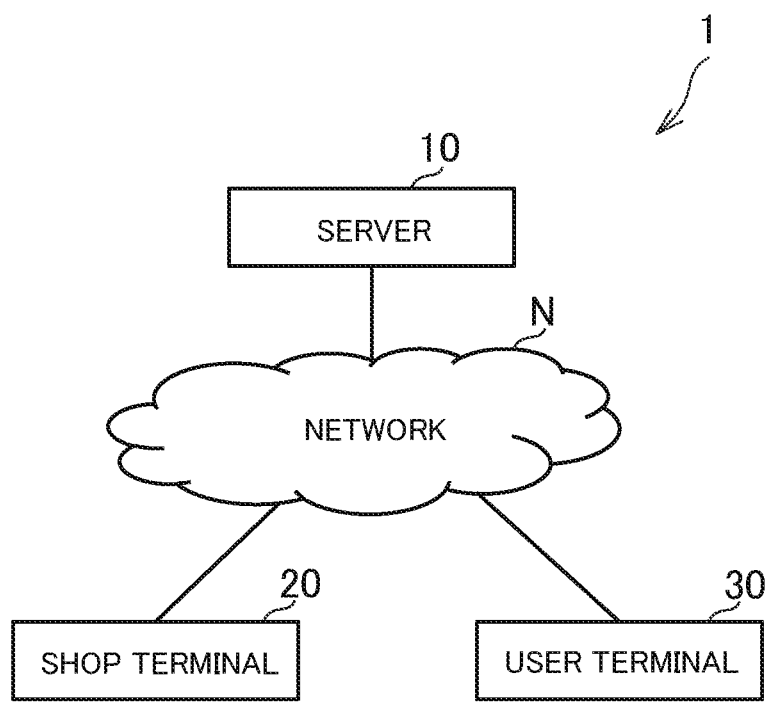
FIG. 1 is a diagram illustrating an overall configuration of a summary generating system.

The embodiment of the summary generating system according to the present invention will be described below. FIG. 1 is a diagram illustrating an overall configuration of the summary generating system. As shown in FIG. 1, the summary generating system 1 includes a server 10, a shop terminal 20, and a user terminal 30, each connected to a network N such as the Internet. FIG. 1 shows one server 10, one shop terminal 20, and one user terminal 30, although the number of each of them may be two or more.

Figure 2:
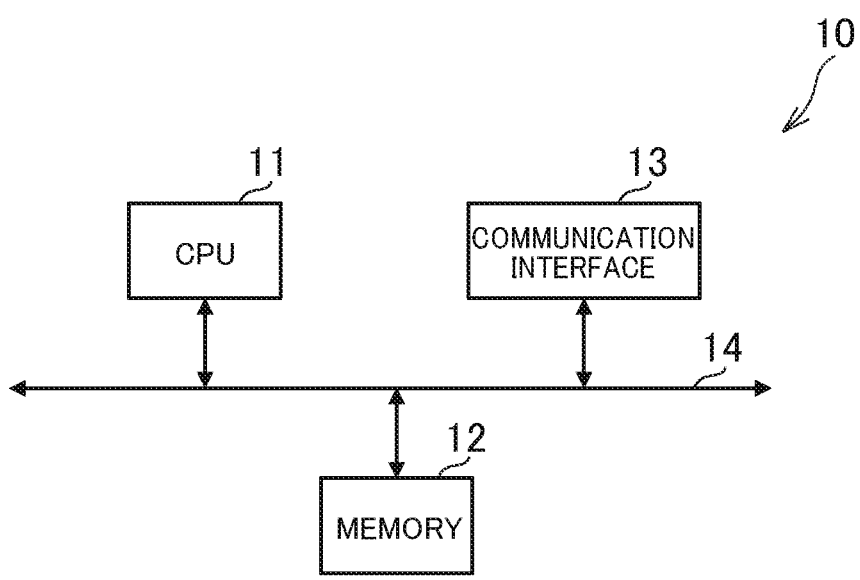
FIG. 2 is a diagram illustrating a physical arrangement of a server.

FIG. 2 is a diagram illustrating a physical arrangement of the server 10. As shown in FIG. 2, the server 10 is a server computer and includes, for example, a CPU 11, a memory 12, and a communication interface 13, which are connected to one another via a bus 14. The server 10 is an example of the summary generating device according to the embodiment of the present invention. The CPU 11 executes processing in accordance with programs and data stored in the memory 12. FIG. 2 shows one CPU 11, although the server 10 may include at least one processor, and may include two or more CPUs 11. The memory 12 includes a main storage unit and an auxiliary storage unit. For example, the main storage unit is a volatile memory such as a RAM, and the auxiliary storage unit is a nonvolatile memory such as a hard disk and a flash memory. The communication interface 13 includes a wired or wireless communication interface for data communications through the network N, for example.

The shop terminal 20 is a computer operated by a person in charge in a shop, and the user terminal 30 is a computer operated by a user. Each of the shop terminal 20 and the user terminal 30 is, for example, a personal computer, a portable information terminal (including a tablet computer), or a mobile phone (including a smartphone). Each of the shop terminal 20 and the user terminal 30 includes a CPU, a memory, a communication interface, an input device such as a touch panel and a mouse, and a liquid crystal monitor or an organic EL monitor, for example.

The programs and data described as being stored in the memory 12 may be provided to the server 10 through the network N. The hardware configuration of the server 10 is not limited to the above example, and various types of hardware can be applied. For example, the server 10 may include a reader (e.g., optical disc drive and memory card slot) for reading a computer-readable information storage medium, and an input/output interface (e.g., USB port) for directly connecting to external devices. The programs and data stored in the information storage medium may be provided to the server 10 through the reader or the input/output interface.

[2. Overview of Summary Generating System]

The summary generating system 1 uses a plurality of different algorithms for natural language processing so as to generate a summary of a document. The algorithms used in the summary generating system 1 analyze a document, extract one or more elements from the document, and obtains appearance degrees of the respective extracted elements. Such algorithms are known to have various types, and any known or novel algorithm may be used in accordance with a type of a document. In this embodiment, a case will be described in which six methods of BG, NE, SD, SF, Tf-Idf (Term frequency-Inverse document frequency), and attribute extraction are used. These algorithms are non-learning models (unsupervised models) that do not require learning based on training data, and analyze terms in a document based on linguistic characteristics. Overview of the algorithms will be described later.

The document is a group of characters for which a summary is generated, and may be any document, such as a web page, judgment document, article, editorial, magazine, novel, and patent gazette. The document is provided as electronic data because it needs to be analyzed by a computer. The electronic data may have any file format, such as document file, HTML file, XML file, rich text file, and text file. The document includes at least one sentence, and may include images, video, and tables other than sentences.

The sentence is a unit of language expression that represents one complete meaning, and includes at least one term. The term means a character string or a word. In a case of Japanese, for example, a sentence is a portion separated by a terminal punctuation mark, such as a portion from the first term of the document to the first terminal punctuation mark, or a portion from the term following a certain terminal punctuation mark to a next terminal punctuation mark. In a case of English, for example, a sentence is a portion separated by a period, such as a portion from the first term of the document to the first period, or a portion from the term following a certain period to a next period.

The summary briefly represents a point of argument of a document, and includes the smaller number of sentences or words than the document. The summary includes at least one sentence, and, in addition to sentences, may include images, video, and tables in the document. The summary may be made by combining sentences included in the document without changing the sentences, or changing sentences that are included in the document then combining the sentences. In this embodiment, the non-learning model is used, and thus a summary is generated without changing sentences in the document.

In this embodiment, a description on a web page of a product sold in a shop on the online will be described as an example of the document. The web page may be generated in any layout and includes, for example, a product title, a description, an image, video, and a table. The web page may be generated in a predetermined layout, or a layout may not be particularly determined. The web page may be displayed on a browser of the user terminal 30, or on an application installed in the user terminal 30.

A person in charge in a shop can freely generate a web page by operating the shop terminal 20, and insert any text, image, video, and table in the web page. As such, some shops may input a long description, which reduces readability of the web page. In this regard, the summary generating system 1 according to this embodiment generates a highly readable summary including only an important part as a product description from the description on the web page, and provides the summary to a user.

As described above, the elements extracted using the algorithms are different depending on the algorithms, and some algorithms are suitable or unsuitable to certain types of documents to analyze, and thus analyzing with a specific algorithm is considered to be biased to a specific view. As such, in order to generate a highly accurate summary, that is, a summary collectively including features of a document as much as possible from a variety of views of a variety of viewers, it is desirable to use a plurality of algorithms in combination with one another to analyze the document instead of using a single algorithm.

In this regard, as described in the Background Art, even a plurality of algorithms are used in combination with one another, if elements extracted by a specific algorithm are preferentially selected, the result to be obtained is eventually the same as the result obtained by using a specific algorithm, and thus accuracy of the summary cannot be satisfactorily improved. For example, regarding a web page of a product as in this embodiment, it is conceivable that a person in charge in a shop preferentially include features of the product in the description in order to explain the product to consumers. For this reason, such a description includes names of attributes of the product and attribute values more frequently than other words or expressions. As such, in the above described six algorithms, the appearance degrees of the elements extracted by using the attribute extraction are distributed in the higher range than the appearance degrees of the elements extracted by other algorithms.

In view of the above, the summary generating system 1 according to this embodiment normalizes appearance degrees for respective algorithms to adjust differences in distributions of the appearance degrees between the algorithms, thereby preventing only a specific algorithm from being used. This increases accuracy of a summary. In the following, the summary generating system 1 will be described in details.

[3. Functions Implemented in Summary Generating System]

Figure 3:
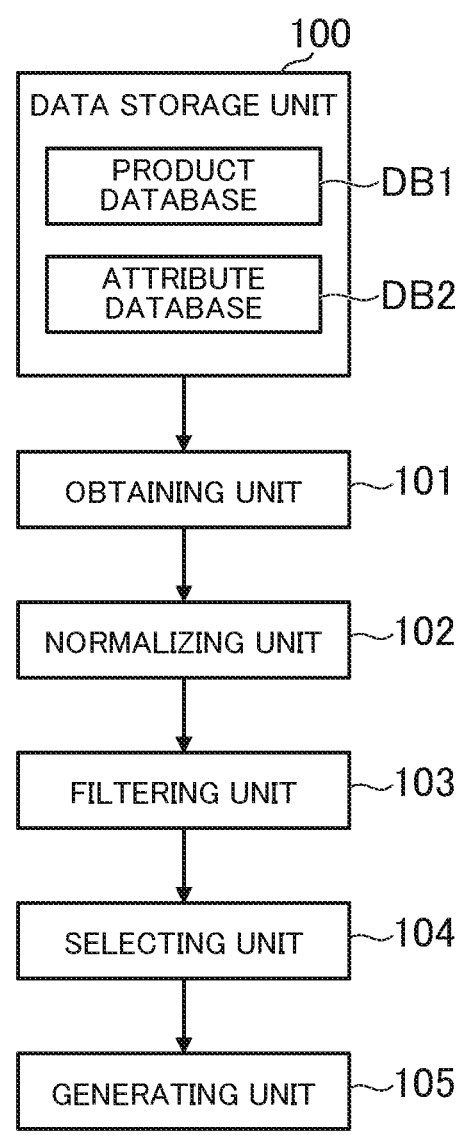
FIG. 3 is a functional block diagram showing an example of functions implemented in the summary generating system.
Figure 4:
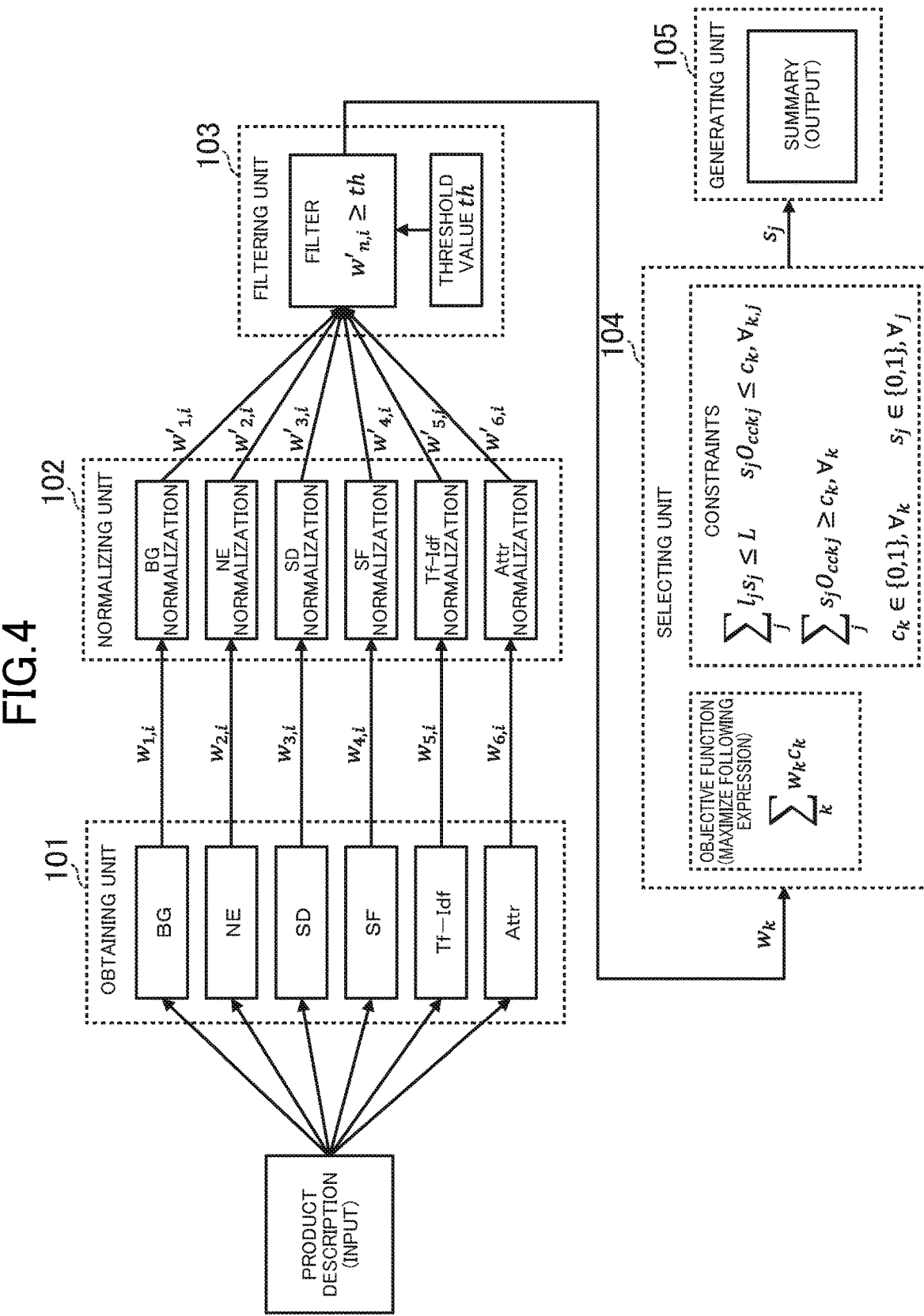
FIG. 4 is a diagram explaining processing executed by each function.

FIG. 3 is a functional block diagram showing an example of functions implemented in the summary generating system 1, and FIG. 4 explains processing executed by each function shown in FIG. 3. As shown in FIG. 3, the summary generating system 1 implements a data storage unit 100, an obtaining unit 101, a normalizing unit 102, a filtering unit 103, a selecting unit 104, and a generating unit 105. In this embodiment, a case will be described in which these functions are implemented by the server 10.

[3-1. Data Storage Unit]

The data storage unit 100 is implemented mainly by the memory 12. The data storage unit 100 stores data necessary for generating a summary. Here, a product database DB1 and an attribute database DB2 will be described as an example of data to be stored in the data storage unit 100.

FIG. 5 is a diagram illustrating an example of data storage of the product database DB1. As shown in FIG. 5, the product database DB1 stores various kinds of information about products. Web pages are displayed based on the information stored in the product database DB1. The product database DB1 stores information such as a description, an image, word-of-mouth information, and a summary generated by the generating unit 105 in association with a product ID for uniquely identifying a product. In FIG. 5, the information such as descriptions is written in English, although it may be written in any language such as Japanese and Chinese.

The description stored in the product database DB1 is a document for which a summary is generated by the generating unit 105. All of the descriptions stored in the product database DB1 may be targets for which summaries are generated, or only the descriptions including equal to or more than the predetermined number of characters or words, such as 100 characters and 50 words, may be targets for which summaries are generated. As described above, a person in charge in a shop can freely enter any text in the shop terminal 20 as a description. An amount of a description (the number of characters) may have the upper limit value, or may not be particularly limited. FIG. 5 shows the descriptions only in texts, although a description may be generated by using a predetermined markup language. In this case, the description may include a table tag, for example.

The image is a product image captured by a camera, and uploaded by the shop terminal 20. The word-of-mouth information is a review of the product uploaded by a user terminal 30 of a user who purchased the product, and includes any text. Some products have a lot of word-of-mouth reviews, for which summaries may be generated as described in a variation later.

The information stored in the product database DB1 is not limited to the above example. For example, the product database DB1 may store any information about the product, such as a shop ID for uniquely identifying a shop that sells the product, a product title, a genre, a category, video, and a total stock.

FIG. 6 is a diagram illustrating an example of data storage of the attribute database DB2. As shown in FIG. 6, the attribute database DB2 stores combinations of attributes and attribute values of products. The information stored in the attribute database DB2 is used for the attribute extraction. The attribute database DB2 may be generated by an administrator of the summary generating system 1 or the person in charge in the shop, or generated by extracting words included in the descriptions. In FIG. 6, the attributes and the attribute values are written in English, although they may be written in any language such as Japanese and Chinese.

The attribute is classification of products, such as color, size, brand, weight, price range, and place of production. In other words, the attribute is a feature, type, character, genre, and category of a product. Details of a product are written in a description of the product displayed on a web page, and thus the attribute may be described as classification of words included in the description. The attribute database DB2 stores character strings that indicate attribute names (item names). The attribute names may be inconsistently described, and thus a plurality of names indicating the same meaning may be unified as one attribute.

The attribute value indicates specific features of products. The attribute value is represented in a character string, a numeric value, or a combination of these. The attribute is associated with a plurality of attribute values, and the attribute and the attribute value have one-to-many relationship. For example, if the attribute is color, the attribute value is a name of color, such as red, blue, green, and black. For example, if the attribute is size, the attribute value is a name of size, such as S, M, L, and XL. For example, if the attribute is brand, the attribute value is a brand name.

[3-2. Obtaining Unit]

The obtaining unit 101 is implemented mainly by the CPU 11. The obtaining unit 101 obtains elements and their appearance degrees from a document using a plurality of different algorithms, which extract one or more elements from a description of a product, and obtain appearance degrees of the respective extracted elements. The obtaining unit 101 executes, for each algorithm, processing for extracting elements from the description of the product and processing for calculating appearance degrees of the elements.

The obtaining unit 101 may use any combination of algorithms. For example, the algorithms include at least one of the Tf-Idf and the attribute extraction, which extracts an attribute value of a predetermined attribute as an element. At least one of the Tf-Idf and the attribute extraction may be used, although in this embodiment, both of the Tf-Idf and the attribute extraction are used because the inventors of the present application independently have found that these algorithms have good compatibility with a description of a product. In this embodiment, a description of a product corresponds to a document, and thus a plurality of algorithms include the attribute extraction method, which extracts an attribute value of an attribute of a product as an element.

In this embodiment, an element is a character or a term, or a combination thereof extracted using the algorithms from a document for which a summary is generated. In many cases, the element is a group of characters or terms extracted from a document, although a term that is not included in a document may be extracted as an element as in the SF. Typically, the element is a linguistic cluster of one to several characters or one to several terms.

In the algorithms, an appearance degree of an element is calculated. The element may be referred to as a concept. The element may be formed of terms that have meaning by themselves, or formed of characters that have no specific meaning by themselves, and may be different depending on an algorithm to be used or a language of a text to be analyzed. For example, in the BG, which is a representative algorithm, if a text to be analyzed is English, the element is formed of two adjacent words. If a text to be analyzed is Japanese, the element is formed of two adjacent characters. The plurality of algorithms may extract the same elements, although in this embodiment, elements are extracted separately for respective algorithms. As such, an element extracted by a certain algorithm may not be extracted by another algorithm, or may be accidentally extracted by another algorithm. In this embodiment, an appearance degree of an element is calculated by an algorithm that has extracted the element, and is not calculated by another algorithm that has not extracted the element.

In this embodiment, "appearance degree" is a value that is calculated based on the number of times a certain element is extracted from a specific document (referred to as "appearance frequency"). When the appearance frequency is higher, the appearance degree is higher, and when the appearance frequency is lower, the appearance degree is lower. The appearance degree includes the appearance frequency. In the six algorithms used in this embodiment, BG, NE, SD, SF, and attribute extraction methods use appearance frequency as an appearance degree, and the Tf-Idf uses a Tf-Idf score as an appearance degree.

Typically, an element that appears many times in a specific document is considered to be an important element that characterizes the document. As such, an element having a higher appearance degree is considered to be a more important element. In other words, the appearance degree is considered to be an estimated value of importance of an element in a document. In the field of natural language processing, the appearance degree may be referred to as a feature amount or a feature score. In many algorithms, the appearance degree is calculated for a single document to be analyzed, although some algorithms, such as the Tf-Idf, calculate an appearance degree in view of not only appearance frequency of an element in a single document but also appearance of an element throughout a plurality of documents (entire documents).

The obtaining unit 101 obtains a description of a product stored in the product database DB1, and obtains appearance degrees of elements included in the description for each algorithm. In the following, an element is marked with i, and an appearance degree is marked with $w_{n,i}$.

In an element i and an appearance degree $w_{n,i}$, i is a natural number and a value uniquely identifying the element. Here, an initial value of i is set to 1, and i is incremented whenever an algorithm extracts an element. In this embodiment, values indicating elements are reassigned after the filtering described later, and thus, i is a value indicating an element before the filtering.

In an appearance degree $w_{n,i}$, n is a natural number uniquely identifying an algorithm. In this embodiment, six algorithms of BG, NE, SD, SF, Tf-Idf, and attribute extraction are used, and thus values 1 to 6 are assigned to values of n in this order. The appearance degree $w_{n,i}$ indicates an appearance degree of an element i calculated by an algorithm indicated by a value of n.

As shown in FIG. 4, the obtaining unit 101 obtains a description of a product stored in the product database DB1, and inputs the obtained description into each of the six algorithms. For each algorithm, the obtaining unit 101 extracts an element i included in the description of the product based on methods defined in respective algorithms, and counts the number of times the element i appears so as to obtain an appearance degree $w_{n,i}$. The methods of extracting the element and calculating the appearance degree may use methods defined in the algorithms, and calculation is performed as described below, for example.

For example, the BG is an algorithm for analyzing a document by an appearance degree of two consecutive terms (see e.g., "https://lagunita.stanford.edu/c4x/Engineering/CS-224N/asset/slp4.pdf"), and thus the obtaining unit 101 extracts two consecutive terms (a set of two adjacent terms) included in the description as an element i, and counts the number of times the element i appears in the description, thereby obtaining an appearance degree $w_{1,i}$. For example, in a case of Japanese, two consecutive characters are an element i, and in a case of English, two consecutive words are an element i. The BG is an example of what we call n-gram. When using the 1-gram, an element i is formed of one term, and when using the 3-gram or more, an element i is formed of three or more terms. The obtaining unit 101 may extract only an element having an appearance degree equal to or more than a threshold value (e.g., 2) as an element $c_i$, and may eliminate an element that appears only one time. The same applies to other algorithms.

For example, the NE is an algorithm to analyze unique expression in a document (see e.g., "https://www.nltk.org/book/ch07.html"), and thus the obtaining unit 101 extracts unique expression (e.g., proper noun) included in the description as an element i, and counts the number of times the element i appears in the description, thereby obtains an appearance degree $w_{2,i}$. For example, if a term in a list of predetermined unique expressions is included in the description, the term can be an element in the NE. For example, in many cases, a word in marks such as parentheses and double quotes is unique expression, and thus a part included in these marks can be an element in the NE. For example, in a language such as English, a term written in capital letters in a text is likely unique expression, and thus a part written in capital letters in a text can be an element in the NE.

For example, the SD is an algorithm to analyze relationship among terms in a document (see e.g., "https://nlp.stanford.edu/software/dependencies_manual.pdf"), and thus the obtaining unit 101 extracts a combination of terms grammatically related to each other in the description as an element i, and counts the number of times the element i appears in the description, thereby obtains an appearance degree $w_{3,i}$. For example, a plurality of words that are tagged with parts of speech and then extracted are elements in the SD. For example, "'s" and "s'", which are possessive cases of nouns, modify subsequent nouns (having a modification relationship), and thus "'s" and "s'" can be elements in the SD. For example, if a plurality of nouns are aligned, those nouns are related to one another, and thus can be elements in the SD. For example, a verb in passive mode modifies a noun in many cases, and thus can be an element in the SD.

For example, the SF is an algorithm to semantically analyze a term in a document (see e.g., "https://en.wikipedia.org/wiki/Frame_semantics_(linguistics)"), and thus the obtaining unit 101 extracts terms semantically related to each other in a description as an element i, and counts the number of times the element i appears in the description, thereby obtains an appearance degree $w_{4,i}$. For example, a combination of a plurality of words added with semantic connections between the words is extracted as an element in the SF. For example, combinations of terms, such as an object and its owner, an object and its attribute (e.g., color and size), the whole and the parts, and superordinate concept and subordinate concept, can be an element in the SF. In the SF, an element may be replaced with another name that is not included in the description.

Further, for example, the Tf-Idf is an algorithm to extract a term in a specific web page (see e.g., "https://ja.wikipedia.org/wiki/Tf-idf"), and thus the obtaining unit 101 extracts at least one term included in a description as an element, and counts the number of times the element appears in the web page and the number of times the element appears in other web pages, thereby obtaining an appearance degree $w_{5,i}$. In the Tf-Idf, not a term used in throughout a plurality of web pages but a term particularly used in a specific web page is evaluated as having a higher appearance degree $w_{5,i}$. As such, when the number of times the element i appears in the specific web page in which the element i is extracted is greater, the appearance degree $w_{5,i}$ of the element i is higher, and when the element i appears throughout in many other web pages, the appearance degree $w_{5,i}$ of the element i is lower.

For example, the attribute extraction is an algorithm to analyze an attribute or an attribute value included in a document, and thus the obtaining unit 101 extracts an attribute or an attribute value included in a description as an element i, and counts the number of times the element appears in the description, thereby obtaining appearance degree $w_{6,i}$. In this embodiment, combinations of attributes and attribute values are stored in the attribute database DB2, and thus, if a term matched with a name of an attribute or an attribute value in the attribute database DB2 is included in a web page, such a term can be an element in the attribute extraction. For example, in a case where a term matched with an attribute value defined in the attribute database DB2 is included in a web page, an attribute name associated with the attribute value may be extracted. In this regard, only an attribute name may be defined without defining an attribute value. In this case, if a term such as "Color: red" appears in the description, such a term can be an element in the attribute extraction. In this case, only "Color" may be an element, or "red" may also be included as an element.

FIG. 7 is a diagram illustrating relationship between elements i and appearance degrees $w_{n,i}$ obtained by the obtaining unit 101. As shown in FIG. 7, the obtaining unit 101 uses each of the algorithms described above to obtain elements i and appearance degrees $w_{n,i}$, and temporarily store the obtained elements i and appearance degrees $w_{n,i}$ in the data storage unit 100 in association with the algorithm that has extracted them. The appearance degrees $w_{n,i}$ of the respective elements obtained by each algorithm are normalized by a normalizing unit 102 described later.

[3-3. Normalizing Unit]

The normalizing unit 102 is implemented mainly by the CPU 11. The normalizing unit 102 normalizes the appearance degrees $w_{n,i}$ obtained by the obtaining unit 101 for each algorithm. In the following, a normalized appearance degree is described as $w'_{n,i}$.

For each algorithm, the normalizing unit 102 normalizes values indicated by appearance degrees $w_{n,i}$ based on the distribution of appearance degrees $w_{n,i}$ of elements extracted by the algorithm. The normalization itself may use various known methods, and the min-max normalization is used in this embodiment. As such, a range of values indicated by the normalized appearance degrees $w'_{n,i}$ is restricted to a specific range. The range of values can be freely determined. Needless to say, other methods such as the z-score normalization may be used. In this case, the range of values indicated by the normalized appearance degrees $w'_{n,i}$ and a statistic of average values and dispersion depend on methods of normalization.

The min-max normalization is to rescale values so that the minimum value and the maximum value in a distribution are kept constant, and different algorithms have the minimum value and the maximum value in common as a statistic. Specifically, when a minimum value of an appearance degree $w_{n,i}$ is $w_{n,min}$ and a maximum value of an appearance degree $w_{n,i}$ is $w_{n,max}$ for each algorithm, the normalizing unit 102 calculates the appearance degree $w'_{n,i}$ after normalization by the following expression 1:

$$w'_{n,i} = (a-b)(w_{n,i} - w_{n,min})/(w_{n,max} - w_{n,min}) + b \quad (1)$$

Here, a and b are any scaling parameters, and in this embodiment, a=10 and b=1. As such, the distribution of the normalized appearance degrees $w'_{n,i}$ has the minimum value of 1 and the maximum value of 10 in each of the algorithms.

As shown in 4, for example, the normalizing unit 102 uses the BG to normalize the appearance degree $w_{1,i}$ of the extracted element i, and obtains the normalized appearance degree $w'_{1,i}$. Similarly to other algorithms, the normalizing unit 102 uses algorithms of NE, SD, SF, Tf-Idf, and attribute extraction to normalize the appearance degrees $w_{n,i}$ of the elements extracted by these algorithms, and obtains the normalized appearance degrees $w'_{n,i}$.

FIG. 8 is a diagram illustrating changes of the distribution of the appearance degrees by each of the algorithms before and after the normalization. In FIG. 8, a vertical axis represents the appearance degrees of elements i in circles. In the example shown in FIG. 8, the appearance degrees $w_{6,i}$ of the attribute extraction is remarkably higher than appearance degrees $w_{1,i}$ to $w_{5,i}$ of the other algorithms. Further, the appearance degrees $w_{5,i}$ obtained by the Tf-Idf indicate higher values than the appearance degrees $w_{1,i}$ to $w_{4,i}$ of other four algorithms of BG to SF, and thus it is not appropriate to simply compare these appearance degrees with a unique threshold value. As such, the normalizing unit 102 normalizes the appearance degrees $w_{n,i}$ obtained by the respective algorithms, thereby bringing the distributions of the normalized appearance degrees $w'_{n,i}$ of the respective algorithms close to one another. In other words, the normalizing unit 102 performs normalization such that the distribution of the appearance degrees $w_{m,i}$ obtained by a certain algorithm is close to the distribution of the normalized appearance degrees $w'_{n,i|n \neq m}$ obtained by other algorithms. Here, to bring a distribution of certain appearance degrees close to a distribution of other appearance degrees means one or more of any statistics amounts (e.g., average value, dispersion, median value, maximum value, minimum value) of the former appearance degrees are close to or matched with the same statistics amounts of the latter appearance degrees.

As shown in FIG. 8, the distribution of the normalized appearance degrees $w'_{1,i}$ to $w'_{6,i}$ is not highly biased, and the normalized appearance degrees $w'_{5,i}$ by the Tf-Idf and the normalized appearance degrees $w'_{6,i}$ by the attribute extraction are distributed in the same range as the normalized appearance degrees $w'_{1,i}$ to $w'_{4,i}$ by the four algorithms BG to SF. That is, the normalizing unit 102 performs the normalization to equalize scales of the normalized appearance degrees $w'_{n,i}$ of the elements extracted by the algorithms, thereby comparing the appearance degrees $w'_{1,i}$ to $w'_{6,i}$ with a unique threshold value. In the example of FIG. 8, the normalizing unit 102 performs the normalization so as to particularly bring the distribution of the appearance degrees $w_{5,I}$ obtained by the Tf-Idf and the appearance degrees $w_{6,i}$ obtained by the attribute extraction close to the distribution of the normalized appearance degrees $w'_{1,i}$ to $w'_{4,i}$ obtained by the other algorithms. Needless to say, to a greater or lesser extent, the normalizing unit 102 performs the normalization so as to bring the distribution of the appearance degrees $w_{m,i}$ obtained by any algorithm close to the distribution of the normalized appearance degrees $w'_{n,i|\neq m}$ obtained by the other algorithms.

[3-4. Filtering Unit]

The filtering unit 103 is implemented mainly by the CPU 11. The filtering unit 103 filters elements based on the appearance degrees $w'_{n,i}$ normalized by the normalizing unit 102. The filtering unit 103 filters elements i based on the normalized appearance degrees $w'_{n,i}$ of the elements i and a filtering condition.

The filtering condition may be a condition for extracting some of the entire extracted elements, and any condition relating to the normalized appearance degrees $w'_{n,I}$ may be determined. For example, the threshold value of the appearance degree $w'_{n,i}$ may be set as the filtering condition, or the top X % (X is a positive number less than 100, e.g., X=about 10 to 30) of the appearance degrees $w'_{n,i}$ may be determined as the filtering condition. As another example, the filtering condition may be a condition in which the elements are sorted in descending order of the normalized appearance degrees $w'_{n,i}$ and then the elements to a predetermined order are extracted.

The filtering condition may be a fixed value, although in this embodiment, is determined dynamically. Here, dynamically determining the filtering condition means that the filtering unit 103 determines a filtering condition on each occasion based on distribution of the normalized appearance degrees $w'_{n,i}$ obtained by each algorithm. That is, the filtering unit 103 determines a filtering condition based on the distribution of the normalized appearance degrees $w'_{n,i}$, and performs filtering based on the determined filtering condition. The filtering condition thus determined may be coincidentally matched with a filtering condition determined for another document, although typically conditions differ for each document.

In this embodiment, a threshold value th of the normalized appearance degrees $w'_{n,i}$ will be taken as an example of the filtering condition. The filtering unit 103 dynamically determines the threshold value th based on the distribution of the normalized appearance degrees $w'_{n,i}$. As shown in FIG. 8, here, the filtering unit 103 determines the threshold value th such that the predetermined percentage of elements i having the higher normalized appearance degrees $w'_{n,i}$ are extracted. The filtering unit 103 performs filtering such that the predetermined percentage of the elements i having the higher normalized appearance degrees $w'_{n,i}$ are extracted regardless of the algorithms used for extraction. The predetermined percentage may be any percentage, and is 20% in FIG. 8, although may be less than 20% or more than 20%.

The filtering is performed mainly to reduce a population when the selecting unit 104 described later selects an element, and thus, if the number of extracted elements i is small, filtering may be omitted. The filtering condition may be determined according to the number of elements i. For example, in the above, the threshold value th is determined such that the top 20% of the elements i are extracted, although, if the number of the elements i is small, the filtering condition may be eased by lowering the threshold value th so that more number of elements are extracted. On the contrary, if the number of the elements i is large, the filtering conditions may be more strict by increasing the threshold value th so as to narrow down the elements i.

As shown in FIG. 4, in this embodiment, the filtered elements are reassigned so as to be consecutive. As such, in the following, the filtered element is described as k, and a normalized appearance degree of such an element is described as $w_k$ (algorithms do not need to be distinguished below, so a value of n is omitted).

"k" of the element k and the appearance degree $w_k$ is a natural number that uniquely identifies a filtered element. Here, an initial value of k is 1, and whenever the filtering unit 103 filters and extracts an element, a value of k is incremented. The elements are narrowed down by filtering, and thus the maximum value of k is smaller than the maximum value of i, which indicates an element before filtering. The values identifying the elements may not be reassigned and original values i may be used as identification information of the elements (in this case, values of k are not consecutive but discrete).

[3-5. Selecting Unit]

The selecting unit 104 is implemented mainly by the CPU 11. The selecting unit 104 selects at least one sentence in a web page based on the appearance degrees $w_k$ normalized by the normalizing unit 102. The sentence selected by the selecting unit 104 is used for generating a summary. The selecting unit 104 may select a single sentence, or a plurality of sentences.

In the following, each sentence included in a description of a product in a web page is marked with "j" for purposes of explanation. "j" of sentence j is a natural number uniquely identifying sentences. Here, an initial value of j is 1, and sentences from the top in the description of the product in the web page will be respectively assigned with values of j.

In this embodiment, a select condition for selecting a sentence j is determined in advance, and the selecting unit 104 selects a sentence j from the description of the product based on the select condition. The select condition may be any predetermined condition, such as, a condition relating to a level of an appearance degree $w_k$, or a condition relating to an amount of a sentence j to be selected. The amount of a sentence j to be selected indicates the number of words, characters, or amount of these included in the sentence j to be selected.

In this embodiment, filtering is performed, and thus the selecting unit 104 uses the normalized appearance degrees $w_k$ of the elements k filtered by the filtering unit 103 to select at least one sentence j from the description of the product based on the predetermined select condition. The elements that are not extracted by filtering are not determined by the predetermined select condition, and the elements k that are extracted by filtering are determined by the predetermined select condition. In other words, the elements that are not extracted by filtering are not included in the population of the selection by the selecting unit 104, and only the elements k that are extracted by filtering are included in the population.

In this embodiment, a case will be described in which the predetermined select condition is that the sum total of the normalized appearance degrees $w_k$ of the elements included in a sentence j selected by the selecting unit 104 is the maximum, and the selected sentence j has less than the predetermined amount. Solving the problem under such a select condition is known as the Integer Linear Problem among the solutions to optimization problems, and known to belong to a class of NP problems. As such, the selecting unit 104 uses an integer linear program (ILP) to select at least one sentence j from the description of the product. That is, while satisfying the predetermined constraints, the selecting unit 104 selects at least one sentence j from the description of the product so as to be an approximate solution that maximizes the predetermined objective function. The elements k filtered by the filtering unit 103 are entered in the algorithm of the ILP.

As shown in FIG. 4, in this embodiment, the objective function is presented in expression 2 below, and constraints are represented in expressions 3 and 4 below. While satisfying the constraints of the expressions 3 and 4, the selecting unit 104 selects an element k and a sentence j such that the value of the expression 2 is maximized. In the expressions 2 to 4 below, if the element k is selected, the value of $c_k$ is 1, and the element k is not selected, the value of $c_k$ is 0. If the sentence j is selected, the value of $s_j$ is 1, and the sentence j is not selected, the value of $s_j$ is 0.

$$\sum_k w_k c_k \quad (2)$$

$$\sum_j l_j s_j \leq L \quad (3)$$

$$s_j O_{cckj} \leq c_k, \forall_{k,j} \quad (4)$$

$$\sum_j s_j O_{cckj} \geq c_k, \forall_k \quad (5)$$

The expression 2 is the sum total of appearance degree $w_k$ of the selected element k. The same element k may appear in a plurality of sentences j. In this case, the appearance degree $w_k$ of such an element k is not added repeatedly, but added only once.

In the expression 3, $l_j$ indicates a length of a sentence j. The length $l_j$ may be the number of characters (symbols) or the number of words. "L" in the expression 3 represents the upper limit value of an amount of a summary, and may be any value. For example, L may be about 150 characters, or 50 words. The constraints in the expression 3 indicate that the sum total of length $l_j$ of the selected sentence j is less than the threshold value L.

$O_{cckj}$ in the expression 4 is 1 if an element k is included in a sentence j, and 0 if an element k is not included in a sentence j. The constraints in the expression 4 indicate that, when a sentence j is selected, an element k included in the sentence j is always selected. In other words, there is no such case where, despite that a sentence j is selected, an element k included in the selected sentence j is not selected. Such an element k must be selected. On the other hand, when a sentence j is not selected, it is not necessary that an element k included in the sentence j is not selected. Such an element k may be included in another selected sentence j.

$O_{cckj}$ in the expression 5 is the same as that in the expression 4. The constraints in the expression 5 indicate that a selected element k is always included in one of selected sentences j. In other words, there is no such case where, despite that an element k is selected, the selected element k is not included in any of the selected sentences j. Such an element k must be included in at least one selected sentence j.

In the above description, while the predetermined constraints are satisfied by the approximation method using the ILP, the sentence j that satisfies the select condition as the approximate solution that maximizes the predetermined objective function is selected, although the selecting unit 104 may use other methods to select a sentence j that satisfies the select condition. For example, the selecting unit 104 may obtain a complete solution using a round robin algorithm. Alternatively, other search algorithms, such as any heuristics, may be used.

[3-6. Generating Unit]

The generating unit 105 is implemented mainly by the CPU 11. The generating unit 105 generates a summary of a description of a product based on sentences j (i.e., sentence j where $s_j=1$) selected by the selecting unit 104. The generating unit 105 may generate the summary by simply arranging the sentences j selected by the selecting unit 104, or by editing some of the sentences j selected by the selecting unit 104. If only one sentence j is selected by the selecting unit 104, the generating unit 105 may simply use the one sentence j as a summary, or edit a part of the one sentence $s_j$ to generate a summary. To edit means to delete or change some of the terms in the sentence j, and to add (insert) a term to the sentence j.

In this embodiment, the generating unit 105 arranges the sentences j selected by the selecting unit 104 in the order that the sentences j appear in the description, thereby generating a summary. In other words, the generating unit 105 does not change the order of the sentences j in the description but arrange the sentences j according to the order in the description, thereby generating a summary. In this embodiment, values of j are assigned from the top of the description, and thus the generating unit 105 arranges the sentences j selected by the selecting unit 104 in the ascending order of values of j, thereby generating a summary.

FIGS. 9 and 10 are diagrams illustrating examples of summaries generated by the generating unit 105. In FIGS. 9 and 10, comparisons of known methods of TextRank and PG (Pointer Generator network) are also shown. TextRank is a type of non-learning models (unsupervised models) similarly to the algorithms described in this embodiment, and an algorithm applying a method of PageRank, which extracts the importance of website pages, to the natural language. PG is a type of learning models (supervised models) that need training data, and an algorithm using convolutional neural network in deep learning. PG is characterized in that sentences included in an entered document are not used as they are but changed so as to be generated as a summary.

As shown in FIGS. 9 and 10, the summary of TextRank is long, redundant, and inaccurate compared to the summary generated by the summary generating system 1 according to this embodiment, and the summary of PG indicates grammatically or semantically incorrect texts, and is partially unclear. According to the research of the present inventors, in TextRank, when a description is relatively short, the description is output as a summary as it is. In PG, when a description includes unique expression, such as a brand name or a model name, which is important when generating a summary, such unique expression is often omitted. On the other hand, as shown in FIGS. 9 and 10, summaries generated by the summary generating system 1 according to this embodiment concisely describe the important part of the description of the product without failure, and thus the accuracy of the summaries are increased.

[4. Functions Implemented in Summary Generating System]

Figure 11:
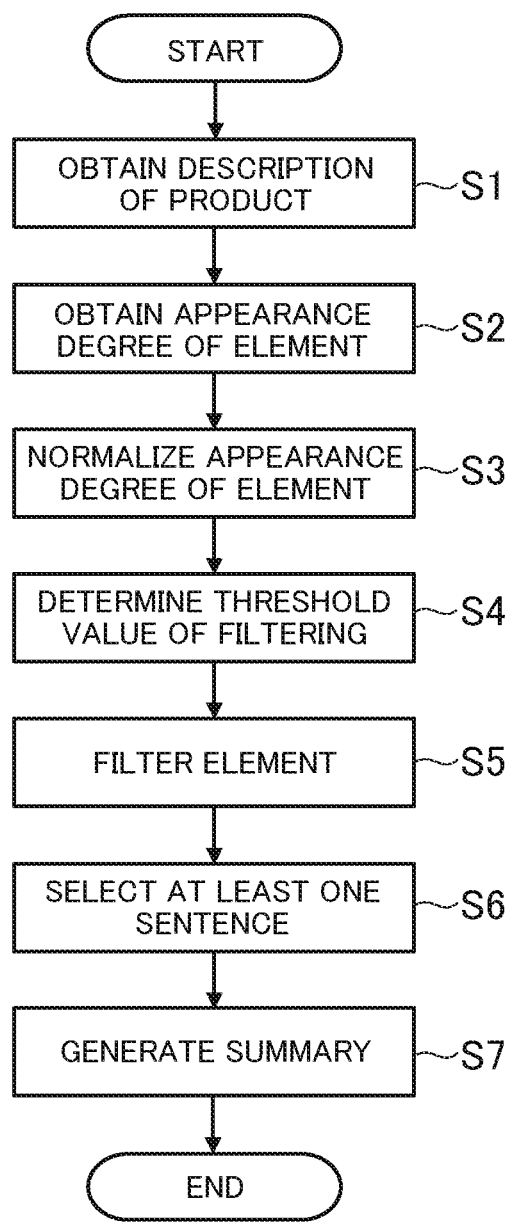
FIG. 11 is a flow chart showing an example of processing executed in the summary generating system.

FIG. 11 is a flow chart showing an example of processing executed in the summary generating system 1. The processing shown in FIG. 11 is executed by the server 10 when the CPU 11 operates in accordance with the program stored in the memory 12. The processing described below is an example of the processing executed by the functional block shown in FIG. 3.

As shown in FIG. 11, the CPU 11 refers to the product database DB1 stored in the memory 12, and obtains a description of a product for which a summary is generated (S1). In S1, the CPU 11 may select a description of any product from the products having descriptions stored in the product database DB1. For example, the CPU 11 selects a description for which a summary has not been generated as a target to generate a summary.

The CPU 11 obtains an appearance degree $w_{n,i}$ of each of a plurality of elements $c_i$ included in the description of the product based on each of a plurality of algorithm (S2). In S2, the CPU 11 uses each of BG, NE, SD, SF, Tf-Idf, and attribute extraction to extract elements i from the description, and obtains the appearance degrees $w_{n,i}$ based on the number of times the elements appear.

The CPU 11 normalizes the appearance degree $w_{n,i}$ of the element i for each of the algorithms (S3). In S3, the CPU 11 normalizes the appearance degree $w_{n,i}$ of the element i extracted by each of the algorithms based on the min-max normalization, and obtains the normalized appearance degree $w'_{n,i}$.

The CPU 11 determines a threshold value th of filtering based on the distribution of the appearance degrees $w'_{n,i}$ normalized in S3 (S4). In S4, the CPU 11 determines the threshold value th such that, of all the elements i, the predetermined percentage of the elements i having the higher normalized appearance degrees $w'_{n,i}$ are extracted.

The CPU 11 filters the elements i based on the appearance degrees $w'_{n,i}$ normalized in S3 and the threshold value th determined in S4 (S5). In S5, the CPU 11 compares an appearance degree $w'_{n,i}$ of each element i with the threshold value th, and extracts elements i having appearance degrees $w'_{n,i}$ equal to or more than the threshold value th from all of the elements i. As described above, when the filtering is executed, the values identifying the elements are reassigned, and the elements become elements k.

The CPU 11 selects at least one sentence j from the description of the product based on the normalized appearance degrees $w_k$ of the elements k filtered in S5 (S6). In S6, while satisfying the expressions 3 and 4, the CPU 11 selects at least one sentence j based on the ILP so as to be an approximate solution that maximizes the predetermined objective function indicated by the expression 2. That is, the CPU 11 selects a sentence j such that the sum total of the appearance degree $w_k$ of the selected element k is maximized under the condition that the amount of the selected sentence j is equal to or less than the upper limit value L, the element k included in the selected sentence j is always selected, and the selected element k is always included in any of the selected sentences j.

The CPU 11 generates a summary based on the sentences j selected in S6 (S7), and the processing terminates. In S7, the CPU 11 generates the summary by arranging the sentences j selected in S6 in order. If there is only one sentence j, such a sentence j becomes a summary. The CPU 11 stores the summary generated in S7 in the product database DB1. When the summary is stored in the product database DB1, the summary is displayed on the user terminal 30 when the user accesses the web page of the product.

The summary generating system 1 described above obtains appearance degrees $w_{n,i}$ of respective elements i included in a description of a product based on each of a plurality of algorithms, normalizes the appearance degrees $w_{n,i}$ for each algorithm, and then selects at least one sentence j to generate a summary. As such, it is possible to prevent only the elements i extracted by the algorithm having high appearance degree $w_{n,i}$ from being biasedly selected. This serves to increase the accuracy of the summary. In other words, the sentence j is selected using the more number of views to generate a summary, and this prevents a summary from being generated using only a specific view, and increases the accuracy of the summary.

Further, the elements i are filtered based on the normalized appearance degrees $w'_{n,i}$, and at least one sentence j is selected based on a predetermined condition. This reduces the populations at the time when the sentence j is selected, and thus the processing load on the server 10 when generating a summary can be reduced, and the summary can be generated more promptly.

At least one sentence j is selected to generate a summary such that the sum total of the normalized appearance degree $w'_{n,i}$ is maximized and the amount of the selected sentence j is less than the predetermined amount. This can serve to generate a summary that includes an important part of a description of a product in an appropriate length, thereby effectively increasing the accuracy of the summary.

At least one sentence j is selected from a description using the ILP, and thus the accuracy of the summary can be effectively increased. The integer linear problem is an NP-hard problem, and it is known that the increase in process items causes remarkable increase in the amount of calculation. In this regard, the process items can be reduced by filtering the elements i based on the normalized appearance degrees $w'_{n,i}$. This can reduce processing load on the server 10 when generating a summary, and thus the summary can be generated more promptly. The generation of a summary using the ILP is processing using the non-learning models. This eliminates the need of, for example, generating training data and a learning machine, and performing a large-scale operation by the RNN, thereby achieving efficiencies in the natural language processing.

The filtering condition is determined and the filtering is performed based on the distribution of the normalized appearance degrees $w'_{n,i}$. As such, the optimal filtering condition according to the distribution of the appearance degrees $w'_{n,i}$ is determined, and accuracy of the filtering can be thereby increased. As a result, a more important part of the description of the product can be extracted, and thus the accuracy of the summary can be efficiently increased.

The filtering is performed such that the predetermined percentage of the elements k having the higher normalized appearance degrees $w'_{n,i}$ are extracted regardless of the algorithm used for extracting the elements i. As such, a summary can be generated by using the more important part of the description of the product, and thus the accuracy of the summary can be effectively improved.

At least one of the Tf-Idf and the attribute extraction is included as an algorithm, and thus it is possible to effectively increase accuracy of a summary of a description of a product having good compatibility with these algorithms.

Further, sentences j selected from the description of the product are arranged in the order that the sentences j appear in the description of the product, and a summary is thereby generated. This serves to create natural flow of the summary, and effectively increase the accuracy of the summary.

In a case of generating a summary of a description of a product, for example, the appearance degrees $w_{6,i}$ of the attribute extraction tend to be high on the whole. In this regard, normalization is performed so that the distribution of the appearance degrees $w_{6,i}$ obtained by the attribute extraction is close to the distribution of the appearance degrees $w_{1,i}$ to $w_{5,i}$ obtained by the other algorithms. This prevents only the elements i extracted by the attribute extraction from being biasedly selected, and serves to increase the accuracy of the summary. That is, the elements i extracted by the algorithms other than the attribute extraction are equally selected. This serves to generate a summary by selecting sentences j based on the more number of views, prevent a summary from being generated using only views based on a specific algorithm, and increase the accuracy of the summary.

[5. Variations]

The embodiment of the present invention is not to be limited to the above described embodiment. The embodiment of the present invention can be changed as appropriate without departing from the spirit of the invention.

For example, the case has been described in which summaries are generated for all of the descriptions of the products stored in the product database DB1, although summaries may be generated for only some of the descriptions. For example, if an amount of a description is small, it is not necessary to generate a summary. As such, a summary may be generated for only a description having equal to or more than a predetermined amount. In this case, the server 10 determines whether the amount of the description of the product stored in the product database DB1 is equal to or more than the predetermined amount. The server 10 may execute the processing of the obtaining unit 101, the normalizing unit 102, the filtering unit 103, the selecting unit 104, and the generating unit 105 to generate a summary of a description of equal to or more than the predetermined amount, and may not execute the processing of these units and not generate a summary for a description of less than the predetermined amount.

For example, in the embodiment, a single summary is generated from a single document, although a single summary may be generated from a plurality of documents. In this regard, the obtaining unit 101 obtains appearance degrees $w_{n,i}$ of elements i included in each of the plurality of documents. The processing of the normalizing unit 102, the filtering unit 103, and the selecting unit 104 is the same as the embodiment except that the appearance degrees $w_{n,i}$ of the elements obtained from the plurality of documents are used. The generating unit 105 generates a summary of a plurality of documents. For example, in a case where the word-of-mouth information described in the embodiment corresponds to the document, the generating unit 105 may generate a single summary based on a plurality of items of word-of-mouth information about a product.

For example, the case has been described in which a description of a product is an example of a document, although a document may have any content, such as a description of facilities or service. The facilities may be accommodation, such as hotels and inns, or restaurants, event venues, companies, or factories. The service may be any service, such as accommodation service, food and beverage serving service in restaurants, financial service, and insurance service. The algorithms may include the attribute extraction for extracting an attribute value of an attribute of facilities or service as an element. The description of facilities or service is entered in view of the nature of the facilities or the service, and thus the description often includes attributes and attribute values of the facilities or the service, and thus the appearance degree of the attribute extraction tends to be higher. As such, the appearance degrees of elements of the description of the facilities or the service extracted by using the attribute extraction may be normalized so as to be matched with the appearance degrees of the other algorithms.

For example, in a case where a web page corresponds to the document, the summary generating system 1 may be used for generating a summary of various web pages, such as news, message board post, chat, SNS, and encyclopedia on the Internet. As described above, the summary generating system 1 may be used for generating a summary of a document other than a web page. For example, the algorithms used in the summary generating system 1 are not limited to the combination of the six algorithms described in the embodiment, but may be any combination of algorithms. For example, only two to five of the six algorithms described in the embodiment may be used, or algorithms other than these algorithms may be used.

For example, the filtering unit 103 may be omitted from the functions of the summary generating system 1. For example, the data storage unit 100 does not need to be included in the summary generating system 1, but may be implemented by a database server. For example, the functions described as being implemented by the server may be implemented by a computer other than the server 10, such as the shop terminal 20. That is, a computer other than the server 10 may correspond to the summary generating device according to the embodiment of the present invention.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A summary generating device comprising at least one processor is configured to:
    use a plurality of different algorithms, wherein each of the plurality of different algorithms extract one or more elements from a document and obtain an appearance degree of each of the extracted elements, so as to obtain the elements and the respective appearance degrees of the elements from the document;
    normalize the obtained appearance degrees for each of the algorithms such that the appearance degrees obtained from each of the extracted elements are normalized to one another;
    select at least one sentence from the document based on the normalized appearance degrees; and
    generate a summary of the document based on the selected sentence.

2. The summary generating device according to claim 1, wherein
    the at least one processor:
        filters the elements based on the normalized appearance degrees, and
        uses the normalized appearance degrees of the filtered elements so as to select at least one sentence from the document based on a predetermined select condition.

3. The summary generating device according to claim 2, wherein
    the predetermined select condition is where a sum total of the normalized appearance degrees of the elements included in the selected sentence is maximized and an amount of the selected sentence is less than a predetermined amount.

4. The summary generating device according to claim 3, wherein
    the at least one processor uses an integer linear program so as to select at least one sentence from the document.

5. The summary generating device according to claim 2, wherein
    the at least one processor determines a filtering condition based on a distribution of the normalized appearance degrees, and performs filtering based on the determined filtering condition.

6. The summary generating device according to claim 5, wherein the filtering is based on a threshold value.

7. The summary generating device according to claim 2, wherein
    the at least one processor performs the filtering such that a predetermined percentage of the elements having higher normalized appearance degrees are extracted, regardless of an algorithm used for extraction.

8. The summary generating device according to claim 1, wherein
    the plurality of algorithms include at least one of a TF-IDF (Term frequency-Inverse document frequency) method or an attribute extraction method for extracting an attribute value of a predetermined attribute as the element.

9. The summary generating device according to claim 1, wherein
    the at least one processor generates the summary by arranging the selected sentences in an order that the sentences appear in the document.

10. The summary generating device according to claim 1, wherein
    the document is a description of a product, a facility, or service,
    the plurality of algorithms include the attribute extraction method for extracting an attribute value of an attribute of the product, the facility, or the service as the element, and
    the at least one processor performs normalization such that a distribution of the appearance degrees obtained by the attribute extraction method is close to a distribution of the normalized appearance degrees obtained by other algorithms.

11. The summary generating device according to claim 1, wherein the processor min-max normalizes the obtained appearance degrees for each of the algorithms such that a minimum value for each algorithm are the same and a maximum value for each algorithm are the same.

12. The summary generating device according to claim 1, wherein the processor z-score normalizes the obtained appearance degrees for each of the algorithms.

13. The summary generating device according to claim 1, wherein the processor normalizes the obtained appearance degrees such that an average value for each of the algorithms are close to or the same.

14. The summary generating device according to claim 1, wherein the processor normalizes the obtained appearance degrees such that a median value for each of the algorithms are close to or the same.

15. The summary generating device according to claim 1, wherein the processor normalizes the obtained appearance degrees such that a dispersion for each of the algorithms are close to or the same.

16. A summary generating method comprising:
    using a plurality of different algorithms, wherein each of the plurality of different algorithms extract one or more elements from a document and obtain an appearance degree of each of the extracted elements, so as to obtain the elements and the respective appearance degrees of the elements from the document;
    normalizing the obtained appearance degrees for each of the algorithms such that the appearance degrees obtained from each of the extracted elements are normalized to one another;
    selecting at least one sentence from the document based on the normalized appearance degrees; and
    generating a summary of the document based on the selected sentence.

17. A non-transitory computer-readable information storage medium for storing a program that causes a computer to:
    use a plurality of different algorithms, wherein each of the plurality of different algorithms extract one or more elements from a document and obtain an appearance degree of each of the extracted elements, so as to obtain the elements and the respective appearance degrees of the elements from the document;

normalize the obtained appearance degrees for each of the algorithms such that the appearance degrees obtained from each of the extracted elements are normalized to one another;

select at least one sentence from the document based on the normalized appearance degrees; and generate a summary of the document based on the selected sentence.

* * * * *